United States Patent [19]

Huchette et al.

[11] 4,153,734

[45] May 8, 1979

[54] DRY COLORING MATERIAL FROM BY-FOOD PRODUCT OF STARCH MANUFACTURE

[75] Inventors: Michel Huchette; Guy Bussière, both of Lestrem, France

[73] Assignee: Roquette Freres, Lestrem, France

[21] Appl. No.: 833,610

[22] Filed: Sep. 15, 1977

[30] Foreign Application Priority Data

Sep. 15, 1976 [FR] France .................................. 76 27711

[51] Int. Cl.$^2$ ............................................. A23L 1/275
[52] U.S. Cl. ...................................... 426/250; 426/540
[58] Field of Search ............... 426/250, 540, 640, 628, 426/656

[56] References Cited

U.S. PATENT DOCUMENTS

| | | | |
|---|---|---|---|
| 2,222,306 | 11/1940 | Atwood | 426/656 |
| 2,349,818 | 5/1944 | Fetzer | 426/656 |
| 2,989,404 | 6/1961 | Nelson | 426/628 |
| 4,027,042 | 5/1977 | von Elbe et al. | 426/540 |

*Primary Examiner*—Jeanette M. Hunter
*Attorney, Agent, or Firm*—Larson, Taylor and Hinds

[57] ABSTRACT

Coloring material for the food industry constituted by a powdery mixture with more than about 85%, and preferably with more than 90% of dry matter formed essentially from about one-third of starch and from about two-thirds proteins, and obtained from the by-product, rich in proteins, of the corn starch factory generally denoted by the expression "protein milk" by a drying whose conditions are selected so that said powdery mixture responds to given conditions of granulometry, to the test conditions of tasting in butter and to the maximum permitted loss test to light reflexion as well as, preferably, to the conditions of the decantation test and of the unctuosity test.

13 Claims, No Drawings

DRY COLORING MATERIAL FROM BY-FOOD PRODUCT OF STARCH MANUFACTURE

The invention relates to a novel coloring material for the food industry.

It relates also to a process for the manufacture of the novel coloring material.

The food industry is a large consumer of coloring materials whose economic incidence, although these products are applied in very small amounts, is unquestionable by reason of their very high cost price.

Two reasons explain their importance in food products; on the one hand, the color constitutes an essential purchasing motivation, other organoleptic criteria being generally, by reason of the presence of wrappings unobservable at this stage; on the other hand, during consumption, the color is the first impression received and hence, largely influences (favorably or unfavorably), the subsequent impressions, that is to say texture, odor and taste.

Nevertheless, food coloring materials present, from the technological point of view, numerous problems as regards their supply, their stability in processing such as sterilization treatment and as regards their preservation.

Also, it has been observed, with regard to the natural coloring materials first used and constituted notably by plant extracts obtained by physical means, that there is more and more competition on the one hand, from synthetic coloring materials whose cost price is often lower, supplies being independent of climatic conditions, the variety of colors being greater and the stability being more marked, and on the other hand, from coloring materials extracted from vegetable materials by chemical means, which just as synthetic coloring materials, guaranty a given coloring power per unit weight.

It is nonetheless true that the persistent uncertainty with regard to the innocuousness on the one hand, of at least certain synthetic coloring materials, and on the other hand, of traces of solvents persisting in the natural coloring materials obtained by the above mentioned chemical extraction, in particular under pressure of public opinion and also of public authorities, gives rise to a notable regain in favor of natural coloring materials, whose manufacture does not bring into play chemical treatments.

It is hence an object of the invention to provide the food industry with a novel coloring material of natural origin, obtained without the application of chemical treatments, and responding satisfactorily to the various desiderata of practice.

The coloring material according to the invention is constituted by a powdery mixture with more than about 85% and preferably more than 90% of dry matter formed essentially from about one-third by weight of starch and about two-thirds by weight of proteins and obtained from the by-product, rich in proteins, from the corn starch factory, generally denoted by the expression "protein milk", by a drying whose conditions are selected so that said powdery mixture responds to the granulometry and to the conditions of the taste test in butter and to the maximum permitted loss to light reflexion test, as well as, preferably, to the conditions of the decantation test and of the viscosity test, whose definitions are given below.

More particularly, the coloring material according to the invention is characterized by the fact that:

its granulometry corresponds to the following standards:

100% by weight of the particles less than 200 microns
95% by weight of the particles less than 147 microns
60% by weight of the particles less than 100 microns
and preferably:
100% by weight of the particles less than 200 microns
98% by weight of the particles less than 147 microns
75% by weight of the particles less than 100 microns no grain of coloring material is perceived in the course of the taste test in butter including 1.25% of coloring material, the light reflexion loss does not exceed 15% for the four following wavelengths: 5400, 5770, 6200 an 6810 Å, and preferably minimum height of the colored phase in the course of the decantation test after 10 minutes is 9.5 and preferably, 10.5 cm, the viscosity is greater than 500 cps and preferably than 1000 cps by the viscosity test.

In a modification, the coloring material according to the invention is constituted, when a preservation life of about eight to fifteen days is sufficient, directly by the by-product, rich in proteins, from the corn starch factory, this by-product then being presented either in the form of a protein milk, or in the form of a "cake" with at least about 25% dry material, the dry material of the milk and of the "cake" being formed essentially from about one-third by weight of starch and from about two-thirds by weight of proteins.

The process of manufacture according to the invention comprises spraying or atomizing the above-mentioned milk, carried out under mild controlled conditions enabling a product to be obtained which responds to the above-mentioned characteristics.

The invention consists, apart from the above-mentioned features, of certain other features which are preferably utilized at the same time and which will be more explicitly considered below.

It will, in any case, be well understood by means of the additional description which follows and of the accompanying examples, said description and examples being given with respect to preferred embodiments.

In order, consequently, to manufacture the novel coloring material for the food industry according to the invention, procedure is as follows or in equivalent manner.

It is firstly recalled that the raw material, that is to say the secondary product from the corn starch factory enriched in proteins, or "protein milk", can be obtained at the end of the sequence of the following conventional industrial treatments, to which the corn grain is subjected:

soaking and removal of the soaking waters,
crushing and removal of the germs,
fine grinding resulting in the dispersion of the proteins, of the starch and of the envelopes within the mass,
sifting and removal of the envelopes,
centrifugation under conditions such that there is obtained, on the one hand, a pure starch containing less than about 1% of proteins and, on the other hand, a solution with about 5% of dry matter constituted from about one third of residual starch and from about two thirds of proteins,
a further concentrating centrifugation leading to a viscous solution with about 15% of dry matter.

The concentrated protein milk may be passed on to a filter providing a "cake" with at least 25% of dry matter.

This cake rich in coloring proteins may be used as a food coloring product according as the requirements for preservation do not exceed about eight to fifteen days; the above-said protein milk may also be used as such under the same conditions of preservation.

This is not however the case for the most part and, consequently, the above-said protein milk with 15% of dry material approximately is subjected to an additional processing step of drying providing the coloring material with a constitution and with properties in accordance with the invention due to which it responds to the granulometry conditions which will be specified as well as to the tests.

of taste in butter of maximum permitted loss to light reflexion which will be defined.

Preferably, it responds also to the conditions of the tests of decantation of viscosity which will also be defined.

As regards firstly the granulometry, the coloring material according to the invention must conform to the following standard:

100% by weight of particles less than 200 microns
95% by weight of particles less than 147 microns
60% by weight of particles less than 100 microns and preferably;:
100% by weight of particles less than 200 microns
98% by weight of particles less than 147 microns
75% by weight of particles less than 100 microns.

The taste test in butter is based on the observation according to which the perception of particles or grains on tasting is particularly marked in the case of fatty materials, for example in butter. The taste test is hence carried out by means of a dispersion of the coloring material in butter. The dispersion concerned may be prepared from a suspension with 22% of coloring material in water at 25° C. which is dispersed for example manually by means of a glass stirrer in butter whose temperature is 25° C., so that the concentration of coloring material with respect to the butter is 1.25% of dry matter.

The taste test, which is ruthless, is carried out for example by three persons and it enables an estimation to be made whether the texture is granular or not, that is to say whether the coloring material is suitable or not. The evaluation of the texture in the course of this test is very easy and consequently, a jury of three persons not especially trained is sufficient; none of the three persons must perceive grains in the course of the test.

The maximum permitted loss to light reflexion test enables an evaluation of the degradation of the constituent pigments of the coloring material and the elimination of a coloring material which has undergone too great a destruction of pigments.

This test consists of measuring, for different wavelengths with respect to the reference sample, the percentage of reflected light for the specimen tested whose granulometry corresponds or has been brought to the above-defined conditions, the reference sample being constituted by a specimen of the above-mentioned raw material with about 15% of dry matter, which has been dried under controlled conditions as mild as possible for the pigments, that is to say under vacuum at a temperature slightly above ambient, for example in the neighbourhood of at the most 40° C., due to which the coloring is best preserved.

The measurement of the reflexion is carried out both for the reference specimen and for the specimen tested by means of a photometer, for example the photometer of the "ELREPHO" type marketed by ZEISS.

The tested coloring product is considered as corresponding to the definition of the invention when the reflexion loss between the reference specimen and the specimen tested does not exceed 15% for each of the four wavelengths of the group constituted by 5400, 5770, 6200 and 6810 Å.

As for what is at present called the decantation test it comes from the observation that the perception of grains at the moment of the taste test does not depend only on the particles size but also on a parameter connected with the behaviour of the coloring material in water, this parameter being manifested by a greater or lesser aptitude to decantation.

From the particular behaviour of the hydrated corn protein, it is possible to define a simple and rapid method which permits determination whether the specimen is suitable or not for human food utilization. The dispersion of the sample in water at ordinary temperature, at a concentration of 7% of dry matter is carried out, and into a test tube (height: 20 cm and diameter: 2 cm) is introduced a quantity of suspension of corresponding to 12 cm in height. The variations in height of the colored phase is followed in the course of time: the separation between the supernatant water and the colored phase is very distinct in all cases. Measurements of the height after 10 minutes are sufficient to decide whether the sample tested is suitable or not.

The contain is that after 10 minutes of decantation, the height of the colored phase must be at least 9.5 cm and preferably, greater than or equal to 10.5 cm.

As regards lastly the viscosity test, it comes from the observation that the "proteins - water" bond is also manifested by a greater or lesser viscosity of the dispersion of coloring material in water. A relationship exists between this rheological measurement and the organoleptic sensation of unctuosity evaluated either in a tactile manner on the suspension of coloring material, or by tasting the finished product (in butter for example). This viscosity is measured within the scope of the present test on a dispersion in water of coloring material with 22% of dry matter, at the temperature of 25° C. by means for example of the Brookfield viscosimeter (SynchroLectric Viscometer) for a speed of 20 rpm, the reading being effected after accomplishment of two complete rotations.

For a specimen according to the invention, the do is higher than 500 cps, and preferably higher than 1000 cps.

Now, corn proteins at present available in commerce co not respond generally simultaneously to the various above-defined selection criteria for the coloring material according to the invention, whether it relates to the protein dried in a controlled mild manner under vacuum (this process would not moreover be, economically speaking competitive) used as a reference in the test of maximum permitted loss to light reflexion or wether it relates to the protein either dried on a drum, or by pneumatic drying followed by grinding, or by micro-waves, even if the protein thus obtained is subjected to additional grinding to bring it to the required particle size.

The invention provides a process enabling the manufacture of a corn protein corresponding to the conditions defined and required for the coloring material according to the invention.

This process consists essentially of a spraying under mild conditions of the raw material constituted by protein milk.

To do this, it is possible to use an atomizer with a vaporizing capacity of 1 to 17 kgs of water approximately per hour, which capacity is dependent on the temperature of the air at the input and which is variable between about 150° and 300° C. This atomizer is equipped with a turbine capable of rotating between about 6000 and 20,000 rpm, and notably at 15,000 rpm, of which the tank diameter is about 1.05 m, whose height of the cylindrical part is about 1.3 m and whose height of the conical part is about 1.1 m. The air flow rate of this atomizer is about 400 kg/h and is equipped with a supply pump with a flow rate of 0 to 15 liters/hour. It is possible to use for example a pilot atomizer of the trade-mark "NIRO-ATOMIZER" and of the "MINOR-PRODUCTION" type. One operates at a flow rate in the neighbourhood of 1.3 liters/hour of protein milk of concentration about 15%, the temperature of the air entering the turbine being fixed between 165° to 220° C., preferably between 180° to 200° C.

It is advantageous to submit the protein milk before atomization to a very short thermic treatment e.g. by injection of overheated water vapor into the conduit by which the protein-milk is brought to the atomizer in order to raise the temperature of this milk to about 150° C. during about 10 seconds.

Due to this treatment, the protein milk is perfectly sterile and the starch contained in said milk is totally gelatinized. The thus treated milk is as easily atomizable as non-treated milk, the coloring power being not affected.

By way of numerical example, the description is given below of the preparation of a sample of about 1200 g of coloring material according to the invention. An amount of at least 8 liters of protein milk with 15% of dry matter is poured into the raw material receiving tank. After heating the atomizer, the air circuit is started and the temperature of the intake air is adjusted to 180° C. by regulating the combustion of the gas serving as a source of heat energy. About half an hour is necessary to reach the steady state. Then the turbine is started up; then the supply pump for the liquid to be atomized is placed in operation. The atomization of about 7 liters of protein milk, namely about 7.8 kg, provides an amount of about 1200 grams of coloring material. The coloring material collected at the bottom of the conical part is recovered in the recovery container provided for this purpose.

The properties of this sample in the various above-mentioned tests have been compared with those of samples obtained respectively by pneumatic drying, by micro-wave and by drying on a drying drum, these samples having moreover been subjected to grinding in order to bring their particle size to the values provided for the product according to the invention, the starting particle size being very distinctly greater than these values.

The results relating to the decantation, viscosity and taste tests as well as the granulometries are collected in Table I

TABLE I

|  | Granulometry particles less than (microns-%) | | | Decantation test | | Viscosity (cps) | Texture judged by tasting |
|---|---|---|---|---|---|---|---|
|  | 200 | 147 | 100 | height after 5 minutes | height after 10 minutes | | |
| Atomization according to the invention | 100 | 98 | 77 | 11.5cm | 10.5cm | 1300 | smooth-no traces of grains |
| on drying drums + grinding | 100 | 96 | 78 | 9.0cm | 5.0cm | 1300 | perceptible grains |
| by micro-waves + grinding | 100 | 94 | 72 | 3.0cm | 2.5cm | 250 | hardly smooth perceptible grains |
| pneumatic drying + grinding | 100 | 95 | 74 | 5.0cm | 3.5cm | 200 | very perceptible grains |

For the maximum permitted loss to light reflexion test, there are assembled in Table II below the results recorded for the reference protein dried under vacuum, that dried according to the invention and that dried by the pneumatic way, the granulometries of the reference sample (drying under vacuum) and of that obtained by pneumatic drying being brought by grinding to a value equivalent to that of the sample according to the invention.

TABLE II

| Wavelength (in Angstroms) | 6810 | 6200 | 5770 | 5400 | 4950 | 4570 | 4260 |
|---|---|---|---|---|---|---|---|
| Protein dried under vacuum (reference) | 84.6 | 81.1 | 76.5 | 66.3 | 30.8 | 22.2 | 22.8 |
| Protein according to the invention atomized | 80.4 | 76.2 | 70.7 | 60.3 | 26.2 | 18.4 | 18.2 |
| Pneumatically dried protein | 68.6 | 63.6 | 57.3 | 45.5 | 14.3 | 8.5 | 9.4 |

It results from this table that the reflexion is considerable for high wavelengths (higher than 5000 Å), that is to say those corresponding to colors ranging from green to red passing through yellow and orange.

For these wavelengths, drying by atomization according to the invention only very slightly lowers the reflexion intensity with respect to the reference protein: on the other hand, pneumatic drying distinctly reduces it. This reflection loss corresponds to a disappearance of the corn pigments and also to the appearance of degradation products of a dark color.

This being the case, the coloring material according to the invention has an orange yellow color, of high intensity and very pure; it comprises, in fact, the greater part of the pigments of the corn grain.

If the precise nature of the various pigmentary substances of corn is not fully known, the major types of pigments present in commercial corn gluten are known and constituted by:

carotenes per 20 to 30 mg/kg of commercial gluten,
xanthophylls per 100 to 300 mg/kg of commercial gluten.

These figures have only an indicative value; they can vary substantially according notably, on the one hand, to the protein content of the gluten and on the other hand, to the variety of corn used.

From the economic point of view, it is advantageous to increase the pigment content of the coloring material according to the invention; to do this, it is possible, for example, to increase the protein content of the protein milk by modifications of the centrifugation conditions at the moment of the preparation of said milk. It is also possible to resort to a corn rich in pigments such as the "La plata" variety; it is also possible to modify these two factors simultaneously.

The applicant company has studied very carefully a large number of possible applications, within the scope of human food products, for the coloring material according to the invention.

These applications will now be described.

EXAMPLE 1 — Application in products of biscuit manufacture conventional and Viennese pastry.

The yellow color of certain biscuits, conventional pastry and Viennese pastry products is connected, to a great extent, with the addition of eggs and, to a smaller extent, with the butter content. An intensification in the internal color of these articles is hence often sought.

(a) In pastry biscuits of the Genoa type.

Below is indicated the formula of a product relatively poor in eggs, namely:

| | | |
|---|---|---|
| Whole eggs | : | 300 g |
| Water | : | 81 g |
| Powdered sugar | : | 282 g |
| Flour | : | 375 g | and which is prepared, by means of a beater-mixer with a planetary movement, for example that marketed by the KENWOOD Company under the name code "MAJOR", by application of the following steps:

incorporation of the eggs and of the suger and homogenization, addition of water and stirring for 12 minutes by means of the whipper at maximum speed, stopping of the stirring and introduction of the flour, slow manual mixing enabling incorporation of the flour into the paste by means, for example, of a spatula, placing in a mould, baking in the oven for 20 minutes at 230° C.

Besides the control test mentioned above, a test was carried out including the content of 0.36% of coloring material according to the invention (expressed with respect to the total formula, namely 0.41% with respect to the finished product).

The coloring material is incorporated at the start, at the same time as the eggs and the sugar.

The crumb of the finished product has a deeper yellow color than the control, and no unpleasant impression is observed in tasting.

(b) In biscuits of the "Boudoir" type

The formula of these biscuits is as follows:

| | | | |
|---|---|---|---|
| A | { | Whole eggs | : 125 g |
|   |   | Water | : 50 g |
| B | { | Powdered eggwhite | : 5 g |
|   |   | Granulated sugar | : 185 g |
|   |   | Flour | : 200 g |
|   |   | Potato starch | : 20 g |
|   |   | Ammonium carbonate | : 0.5 g |

The manufacture of these biscuits comprises the following successive operational steps:

separate pre-mixing of each of fractions A and B, incorporation of fraction B in fraction A with stirring by means of a beater-mixer with a planetary movement, for example that marketed by the KENWOOD company under the name "MAJOR", heating the mixture to 60° C., stirring for 5 minutes at high speed by means of a beater-mixer of the above-mentioned type, provided with a whipper, then 3 minutes at minimum speed, stopping the stirring and manual incorporation, by means of a spatula, of all the other constituents previously mixed wnd sifted; this mixture is formed as gently as possible, forming (shaping of the dough), by means of a ladle, in the hollow impressions of a greased and floured cooking sheet, designed for this type of biscuit, sprinkling the dough with powdered sugar, stoving at ambient temperature for 3 hours, baking in the oven at 160° C.-180° C. for 12 minutes.

In addition to the above-mentioned biscuit two others were prepared with two doses of the coloring material according to the invention: the latter was mixed with whole eggs in the proportion of 0.23% and of 0.45% with respect to the total of the formula (that is to say 0.28% and 0.54% with respect to the finished product). The yellow color of the inside of the biscuit increases with the dose of proteins.

The incorporation ratio for a color adjudged as optimum depends on the initial color, but in any case is situated generally between 0.2% and 0.5% with respect to the total of the formula.

EXAMPLE 2—Application in products of the dairy cream and dessert type.

Traditionally, creams include eggs, but formulae based on starch (without eggs) have assumed an important position; a more or less sustained yellow color identical with that shown by egg creams, is then applied by coloring materials.

The coloring material according to the invention has been tried in such formulae:

(a) Instant pastry cream

| The control formula comprises | | |
|---|---|---|
| Icing sugar | | 50 g |
| Pregelatinized starch | { for example that known under the trade mark "Instant Clearjel" | 18.5 g |
| Powdered skimmed milk | | 29.75 g |
| Viscosity and gelling agents | { that known under the trade mark SATIAGEL SI/A | 0.75 g |

| The control formula comprises | | |
|---|---|---|
| that known under the trade mark LYGOMME 267/3 | 0.75 | g |
| Salt | 0.25 | g |
| Water | 250 | g |
| "Egg yellow" coloring available commercially (for example that marketed by the SAPLER Company under the name "Eggs yolk coloring") | 6 drops | |

The preparation includes the following steps:

weighing the various powders constituting the formula then mixing, weighing the water in a container and addition of the coloring, dispersion of the powders in the water by manual stirring by means of a whipper.

The trade coloring used in the above-said control test comprises a mixture of tartrazine (synthetic yellow coloring — E 102) and quinolein yellow (synthetic coloring — E 104).

This coloring material is replaced in the following test by 0.57% (with respect to the total of the formula) of coloring material according to the invention which is introduced in that mixture with the other powdered products.

The cream obtained has a color similar to the control and no substantial difference is observed on tasting.

(b) Instant pudding

The formula of the control pudding is as follows:

| | | |
|---|---|---|
| Sterilized half-skimmed milk (of temperature in the vicinity of 20° C.) | 500 | g |
| Icing sugar | 55 | g |
| Pregelatinized starch (for example that of the trade-mark "Presol 121") | 20 | g |
| Sodium pyrophosphate | 1.5 | g |
| Calcium lactate | 0.25 | g |
| "Egg yellow" coloring available in commerce (for example that marketed by the SAPLER company under the name "Egg yolk coloring") | 12 drops | |

The pudding is prepared by application of the following operational steps:

weighing the various powders and then mixing, weighing the milk into a container and addition of the coloring, dispersion of the powders in the milk by manual stirring by means of a whipper.

The test was recommenced, replacing the commercial coloring by 1% of coloring material according to the invention mixed with the other powders.

The color was similar to that of the control.

It is also possible to incorporate the coloring material of the invention in the starch-milk which is to be pregelatinized, thus obtaining a product containing both the pregelatinized starch and the coloring material; it is possible to incorporate this product directly in the formulation.

EXAMPLE 3 — Application in emulsified sauces such as mayonnaise and "salad-dressing".

A sauce of the "salad-dressing" type with 20% of oil was prepared, the formula being:

| | | | | |
|---|---|---|---|---|
| Aqueous phase | Modified waxy corn starch (for example that of the trademark "COL FLO 67" marketed by ROQUETTE FRERES) | : | 2.0% | by weight |
| | Wheat starch | : | 2.0% | " " |
| | Mustard | : | 2.0% | " " |
| | 6° vinegar | : | 8.4% | " " |
| | Atomized glucose sirop | : | 1.5% | |
| | Salt | : | 2.0% | " " |
| | Water | : | 60.1% | " " |
| | Oil | : | 20 % | " " |
| Fatty phase | Powdered egg yolk | : | 2.0% | " " |

The sauce is prepared by the successive application of the following steps:

cooking of the aqueous phase on a water-bath for 10 minutes at 90° C.

cooling to 30° C. of the aqueous phase, introduction of the fatty phase into the aqueous phase with manual stirring by means of a whipper for example, emulsification with a laboratory homogeniser, for example of the A.L.M.O. type marketed by the AUGUSTE ET DES MOUTIS Company and comprising an AO 21 obturator.

The control sauce thus obtained has a slight yellow color.

By the addition of 1% (with respect to the total of the formula) of the coloring material according to the invention, a sauce is obtained of deeper yellow color and adjuged as very pleasant both in appearance and in taste.

The incorporation of the coloring material according to the invention does not pose any problem since the result is similar whether it is added to the aqueous phase or whether it is added to the fatty phase.

EXAMPLE 4 — Use in fatty materials (a) coloring of butter

Butter constitutes the noblest fatty material. It is esteemed for its taste, but also for its yellow color due to carotenoid pigments contributed by fodder and grass in particular. For the consumer, the yellow color is a very important feature, and for this reason, the addition of yellow coloring is permitted legally in France in order to color, in particular, the white butters of winter.

Succinctly, the manufacture of butter comprises:

skimming of the milk, maturing the cream (at 12°–14° C.) with or without the addition of a ferment (in fact a lactic fermentation is involved), chruning consisting of vigorous mechanical treatment enabling separation of the buttermilk (exsudate rich in water) and of the butter; washings with water enabling complete extraction of the buttermilk.

In practice, one operates under conditions similar to those employed in artisanal manufacture: the cream is allowed to mature for 48 hours (without the addition of a ferment); it is then malaxed, for example by means of a mixer with a planetary movement, for example that marketed by KENWOOD under then name "MAJOR", and provided with a paddle. After separation of the buttermilk, the first washing is carried out: cold water at about 5° C. is added: after a very brief malaxation the water, accompanied by buttermilk, is removed. A second washing is again carried out. The butter is then shaped.

The coloring material according to the invention is introduced as such at any one of the stages of manufacture and, preferably at the end of maturation. It is necessary to add a dose comprised between 0.5% and 2% (with respect to the weight of the finished product), and preferably between 0.5% and 1.25%. The ratio of incorporation is essentially a function of the color depth sought and of the pigment content of the cream utilized.

(b) Coloring of margarine

Margarine is in fact an "imitation" butter, obtained from fatty materials mostly of vegetable origin which are not always colored yellow. An incorporation of coloring material according to the invention can usefully correct the color.

One possible composition for margarine is as follows:

| | | |
|---|---|---|
| Coprah (melting point close to 35° C.) | : 41.5 | |
| Palm | : 20.75 | Fatty phase |
| Refined edible oil | : 20.75 | |
| Lecithin | : 1.00 | |
| Water | : 15 | Aqueous phase |
| Starch | : 1.00 | |

It is obtained by application of the following successive operational steps:

Mixing the various liquid fatty materials (melting towards 40° C. in the case of coprah and palm) and the lecithin, dispersion of the starch in the water and then incorporation of this phase into the fatty phase, sudden cooling (by freezing for example) followed by vigorous manual malaxation by means of a spatula.

Besides the control test thus described, another similar test is carried out in which 1% of coloring material according to the invention is incorporated (with respect to the total of the formula). Dispersion in the liquid fatty materials does not pose problems.

The control is very slightly colored (ivory color); the product with the coloring material has a pleasant color. Tasting indicates no substantial difference from the point of view of taste and texture between the two margarines.

EXAMPLE 5 — Use in cheeses

All cheese manufacture necessarily passes through an initial phase of clotting, that is to say transformation of the milk into curdled milk by coagulation of the casein of the milk. This "curd" then serves as the base for the manufacture of all types of cheese. The "curd" can be obtained in various ways:

by acidification : the development of a lactic flora (inherent in the milk or added) in the milk causes the pH to drop through the formation of lactic acid up to the isoelectric point of casein (pH close to 4.6), after which the casein floculates, by enzymatic action of rennet, by a mixed technique: simultaneous or successive enzymatic action of rennet and of the lactic flora.

Manufactures have been carried out in the laboratory by the mixed method: to 1 liter of unboiled farm milk, is added one drop of rennet: it is left for 48 hours at 20° C. so that the lactic flora present in the milk develops. Then the curdled milk is cut up into rectangular parallelepipeds with a square base of about 2 centimeter sides, so as to facilitate the exsudation of the serum. After half an hour, it is placed to drain on a fine cloth. The finished product constitutes a fresh cheese with quite conventional characteristics.

Besides this control test, another is carried out with the addition of 1% of coloring material according to the invention, namely 10 g, dispersed directly into the whole of the milk.

The texture of the curd before drainage is a little less gelled, but drainage is easy. The drained curd constitutes a slightly yellow colored cheese, pleasant both in appearance and taste.

It has been verified that the coloring material can also be incorporated without drawback at the end of the operation by malaxation with the drained curd.

By dehydration for two weeks in a relatively dry atmosphere (44% relative humidity), the control cheese and the cheese colored by means of the above-said coloring materials were converted into "dry" cheeses (for example of the type of certain goat's cheeses). Dehydration leads to an increase in the content of coloring material (with respect to the finished product) and hence leads to an accentuation of the color (orange yellow), whilst the control is slightly yellow.

Consequently, the coloring material according to the invention may be introduced into any type of cheese. By modification of the proportion of proteins and by more or less dehydration (according to the type of cheese), it is possible to obtain a wide range of colors of finished products: from pale yellow to deep orange.

EXAMPLE 6 — Application of the coloring material according to the invention to the field of manufacturing pasta (i.e. noodles, macaronis, spaghettis and similar products).

An insufficient color of such pastes may be made satisfactory by the way of incorporation of about 0.5 to 5%, preferably of 1 to 3% of the coloring material of the invention with respect to the quantity (weight) of wheat used for the manufacture of the pasta.

Thus, by the way of incorporating 2.5% of the coloring material of the invention to a very slightly colored hard wheat semolina (kind BIDI 17) one obtains a pasta having a yellow coloration equivalent to that of a pasta obtained from a well colored hard wheat semolina (kind LAKOTA). These results were confirmed by the measure of the so-called "yellow index" using a spectophotometer, the reflectance being determined at 4.80 and 5.50 manometers.

"yellow index" Y I = 100 (optical density at 480 nm - optical density at 550 nm).

The following data were obtained: YI = 20.5 (kind BIDI 17), and YI = 27.5 (kind LAKOTA).

After incorporation of 2.5% of the coloring material of the invention the Y.I of the BIDI 17 kind becomes 27 i.e. equivalent to that of the LAKOTA kind.

The culinary quality of spaghettis was practically not altered by the introduction of 2.5% of the coloring material of the invention. The yellow pigments of the coloring material are well retained in the cooked paste, the cooking water remaining practically non colored.

It is noted that the amount of coloring material according to the invention mixed with the other constituents of the food to be prepared, is generally of the order of 0.20 to 5% by weight with respect to the finished product, preferably from 0.2 to 3%.

As a result of which whatever the embodiment adopted there is thus provided for the food industry a natural coloring material obtained without the application of a chemical extraction treatment, the properties and advantages of this coloring material emerging sufficiently from the foregoing for it to be unnecessary to dwell further on this subject.

As is self-evident and as emerges already from the foregoing, the invention is in no way limited to those of its types of application and embodiments which have been more particularly considered: it encompasses, on the contrary, all modifications.

We claim:

1. A dry powdery food material having more than about 85% of dry matter consisting essentially of about one-third starch and from about two-thirds proteins said material being obtained from the by-product, rich in proteins, of corn starch manufacture said powdery coloring material having its granulometry corresponding to the following standards:
  100% by weight of particles less than 200 microns
  95% by weight of particles less than 147 microns
  60% by weight of particles less than 100 microns and preferably
  100% by weight of particles less than 200 microns
  98% by weight of particles less than 147 microns
  75% by weight of particles less than 100 microns
said powdery coloring further being defined by having
  no grain perceived in the course of a butter taste test including 1.25% of coloring material,
  a light reflexion loss, for the four following wavelengths: 5400, 5770, 6200 and 6810 A, not exceeding 15%,
the minimum height of the colored phase in the course of a decantation test after 10 minutes being 9.5 cm and,
a viscosity greater than 500 cps.

2. The coloring material of claim 1, wherein the powdery mixture contains more than 90% of dry matter.

3. The coloring material of claim 1, wherein the minimum height of the colored phase in the course of the decantation test after 10 minutes is 10.5 cm.

4. The coloring material of claim 1, wherein the viscosity is greater than 1000 cps.

5. A process for the manufacture of the dry coloring material of claim 2, which comprises atomizing protein milk obtained as a by-product of corn starch manufacture using an atomizer with a vaporizing capacity of 1 to 17 kg of water per hour and equipped with a turbine rotating at 15,000 rpm of which the tank diameter is about 1.05 M, whose height of the cylindrical part is about 1.3 M, and whose height of the conical part is about 1.1 M, the air flow rate of said atomizer being about 400 kg per hour, said atomizer being fed with 1.3 liters per hour of said protein milk at a concentration of 15%, the temperature of the air entering the turbine being fixed between 180° to 200° C. and collecting the coloring material at the bottom of the conical part.

6. A composition of matter comprising a food having incorporated therein as a coloring material 0.20 to 5% by weight of the coloring material of claim 1.

7. A composition of matter of claim 6 wherein the food is a biscuit.

8. The composition of matter of claim 6 wherein the food is selected from milky creams and desserts.

9. The composition of matter of claim 6 wherein the food is an emulsified sauce.

10. A composition of matter according to claim 6 wherein the food is a fatty material.

11. A composition of matter according to claim 6 wherein the food is a cheese.

12. A composition of matter according to claim 6 wherein the food is pasta.

13. A method of coloring food which comprises adding to food as the coloring material, an effective amount of the dry powdery coloring material of claim 2 characterized by the fact that it is constituted, when a period of preservation of about eight to fifteen days is sufficient, the by-product, rich in proteins, of corn starch manufacture which is either in the form of a protein milk, or in the form of a "cake" with at least about 25% of dry material, the dry material of the milk and of the cake being formed essentially from about one-third by weight of starch and about two-thirds by weight of proteins.

* * * * *